United States Patent [19]

Davis et al.

[11] Patent Number: 5,435,817
[45] Date of Patent: Jul. 25, 1995

[54] PORTABLE ROOM AIR PURIFIER

[75] Inventors: George B. Davis, Frederick, Md.;
Joseph J. Kopp, Jr., Decatur; John A. McMillan, Atlanta, both of Ga.

[73] Assignee: Honeywell Inc., Minneapolis, Minn.

[21] Appl. No.: 246,383

[22] Filed: May 20, 1994

Related U.S. Application Data

[63] Continuation of Ser. No. 90,558, Jul. 12, 1993, abandoned, which is a continuation of Ser. No. 998,788, Dec. 23, 1992, abandoned.

[51] Int. Cl.⁶ ............................................. B01D 46/02
[52] U.S. Cl. ..................................... 55/337; 55/385.2; 55/459.3; 55/472; 55/498; 55/356; 96/204
[58] Field of Search ................ 55/337, 386.2, 459.3, 55/472, 471, 498, 500, 521, 356; 96/204, 213

[56] References Cited

U.S. PATENT DOCUMENTS

| | | |
|---|---|---|
| 845,044 | 2/1907 | Baldwin . |
| 1,064,412 | 6/1913 | White ............................ 417/350 |
| 1,794,447 | 3/1931 | Bothezat ........................ 55/473 |
| 1,819,498 | 8/1931 | Cole .............................. 96/133 |
| 2,394,923 | 2/1946 | Little .............................. 55/337 |
| 2,741,329 | 4/1956 | Cherry ............................ 183/43 |
| 2,889,007 | 6/1959 | Lunde ............................ 55/317 |
| 2,972,160 | 2/1961 | Hahn .............................. 15/344 |
| 2,983,432 | 5/1961 | Tupper ........................... 417/432.2 |
| 3,126,263 | 3/1964 | Schwab ........................... 55/317 |
| 3,299,620 | 1/1967 | Hollingworth ................... 96/53 |
| 3,303,771 | 2/1967 | Nesher et al. ................... 454/187 |
| 3,308,610 | 3/1967 | Springer et al. ................ 55/471 |
| 3,309,847 | 3/1967 | Donaldson ....................... 55/268 |
| 3,498,032 | 3/1970 | Scott ............................. 55/471 |
| 3,563,004 | 2/1971 | Schouw ........................... 96/17 |
| 3,609,946 | 10/1971 | Nakagawa et al. .............. 55/296 |
| 3,676,985 | 7/1972 | Foreman et al. ................ 55/317 |
| 3,861,894 | 1/1975 | Marsh ............................. 55/316 |
| 3,936,284 | 2/1976 | Mason ............................. 55/274 |
| 4,121,916 | 10/1978 | Fricke ............................ 55/316 |
| 4,215,646 | 8/1980 | Williams ......................... 116/70 |
| 4,272,261 | 6/1981 | Lynch, Jr. et al. .............. 55/279 |
| 4,321,070 | 3/1982 | Bede .............................. 55/274 |
| 4,477,270 | 10/1984 | Tauch ............................. 55/316 |
| 4,526,592 | 7/1985 | Armbruster ...................... 55/276 |
| 4,547,208 | 10/1985 | Oace .............................. 55/400 |
| 4,560,395 | 12/1985 | Davis ............................. 55/276 |
| 4,629,482 | 12/1986 | Davis ............................. 55/385 |
| 4,824,449 | 4/1989 | Majoros .......................... 55/459 |
| 4,846,859 | 7/1989 | Nobiraki et al. ................. 55/276 |
| 5,120,331 | 6/1992 | Landy ............................. 55/74 |

FOREIGN PATENT DOCUMENTS

| | | |
|---|---|---|
| 1158291 | 6/1958 | France . |
| 615359 | 7/1935 | Germany . |
| 55-024553 | 2/1980 | Japan . |
| 1561978 | 9/1975 | United Kingdom . |

OTHER PUBLICATIONS

Brochure—Pollenex Model PA300, no date.
Brochure—Pollenex Model PA500, no date.
Brochure—Kenmore TM HEPA Filter Air Cleaning System, no date.
Photograph—Honeywell EV-25.
The Bio-tech Catalog, Allergy, Asthma and Respiratory Supplies, dated unknown.
ATMOS-tech Industires HEPA Filters Article, date also unknown.
HomeWorld, vol. 4, No. 24, Nov. 23, 1992.
Peris Industries Inc., P.O. Box 1008, State College, Pa. 16804 For the Model 300B "Filtaire".
Research Products Corp., P.O. Box 1467, Madison, Wis. 53701-1467 (Form 2220) Air Cleaning.
108–Design News/Jun. 17, 1985 High-Efficiency Filter Units Clean, Pufify Room, Auto Air.

*Primary Examiner*—Jay H. Woo
*Assistant Examiner*—Duane S. Smith
*Attorney, Agent, or Firm*—Ian D. Mackinnon

[57] ABSTRACT

A portable and compact room air purifier having an internal filter element through which air is drawn by a centrifugal fan and wherein the air is discharged generally uniformly and radially by passing between at least one generally arcuate scroll and a surrounding deflector. The purifier is automatically deactivated in the event of destruction or removal of the filter housing.

32 Claims, 6 Drawing Sheets

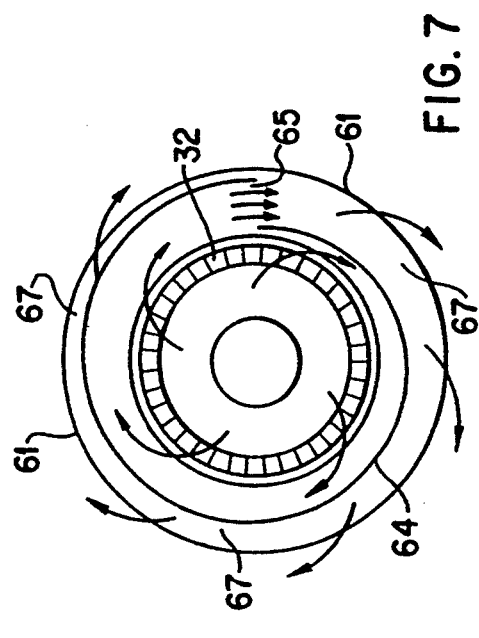
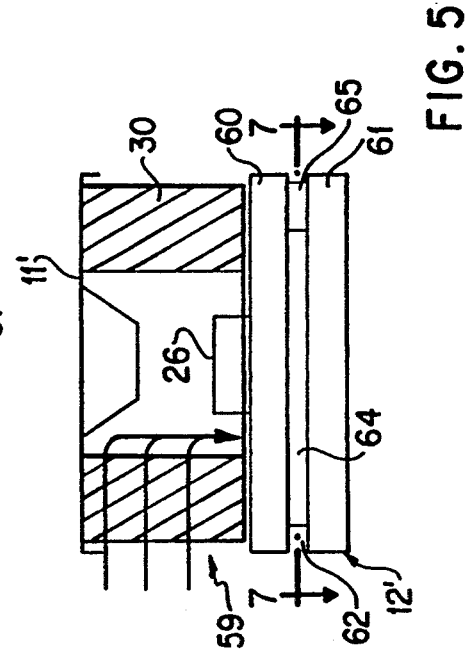
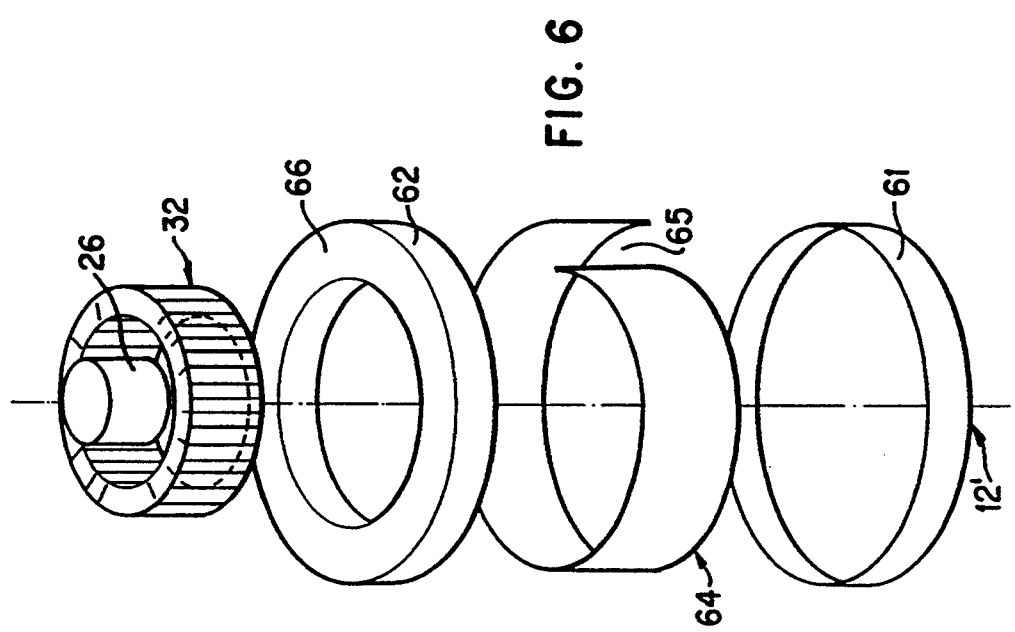

PORTABLE ROOM AIR PURIFIER

This application is a continuation of application Ser. No. 08/090,558, filed Jul. 12, 1993, now abandoned, which is a continuation of application Ser. No. 07/998,788, filed Dec. 23, 1992 now abandoned.

BACKGROUND OF THE INVENTION

1. Field of the Invention

This invention is generally directed to portable room air purifiers and more specifically to a compact portable room air purifier wherein air is discharged after passing through a filter element through a scroll outlet where the air is generally directed tangently with respect to the axis of rotation of a fan used for conveying air therethrough. An outer deflector wall is mounted in spaced and converging relationship with respect to the scroll wall so as to define a tapering passageway through which the air is exhausted generally radially of the unit. In the preferred embodiment, the filter element is a HEPA filter of cylindrical configuration which is mounted within a cover. A motor is mounted centrally of the filter element for driving the fan. The deflector wall is designed to provide a substantially annular opening through which air is exhausted as it is channelled generally circumferentially about the base of the unit.

In the preferred embodiment, the cover is interlocked with a base member with an electrical switch being positioned to deactivate power to the motor in the event the cover is removed or unlocked from the base or in the event the cover becomes shattered thereby releasing pressure of the cover relative to the base thus providing safety and eliminating any possibility of injury from accidental contact with the fan.

In some embodiments, two or more scrolls and/or deflectors may be utilized to distribute the air generally evenly with respect to the periphery of the unit.

2. History of the Related Art

There is an ever increasing need to provide clean air environments both at home and in the work place. Especially in urban areas where pollutant levels are in excess of those recommended for good health, it is necessary to upgrade living and work environments by removing harmful contaminants from the air.

Airborne pollutants contribute to respiratory infections and illnesses and can be especially damaging to individuals with respiratory problems including allergies or from Asthma. Symptoms of high pollutant levels are burning eyes, nose and throat irritations, headaches, dizziness, coughing and sneezing. Individuals are constantly inhaling particles of dust, smoke, pollen, mold spores, acids, bacteria, viruses, animal hair, soot, and harmful chemicals.

In an effort to provide some relief from airborne pollutants, many offices and homes utilize central filtering systems to remove particles from the air. Unfortunately, such centralized systems, which are economically available, do not remove more than approximately 80–85% of the particles in the air and are only effective on particles which are approximately one micron or larger.

The need to have substantially purified air has resulted in the creation of special filter elements which are defined as HEPA filters. HEPA stands for High Efficiency Particulate Air filters which by, federal standard, are filters with a minimum efficiency of 99.97%. The industry defines HEPA filters as those filters which are efficient in removing 99.97% of airborne particles of a size of 0.3 micron or larger.

Although such HEPA filter elements where originally designed for use in ultra clean environments including laboratories, electronic and biologically clean rooms, hospitals and the like, such filters have been used in portable structures which may be utilized in individual room environments.

In U.S. Pat. No. 4,629,482 to George B. Davis, one type of portable HEPA room air purifier is disclosed which has specific utility in allowing for a fairly uniformed distribution of filtered air from the unit and wherein the unit is designed to provide an indication of when the filter cartridge is becoming clogged and should be replaced. The unit incorporates a cylindrical HEPA filter so as to increase the overall surface area of the filter material and the filter is mounted within a housing having an annular discharge adjacent its base. A centrifugal fan is utilized to draw air through the filter and discharge the air radially outwardly of the annular discharge. Due to the configuration of the unit, it is necessary to space the base of the apparatus from the main housing in which the cylindrical filter is mounted which requires that the apparatus be designed somewhat larger than some consumers may prefer.

In view of the foregoing, it has become necessary to overcome the physical detriments of prior art portable filter structures by providing compact portable units without however, affecting the capability of the units to uniformly distribute and filter air within a room.

SUMMARY OF THE INVENTION

This invention is generally directed to compact portable room air purifiers having a housing in which a filter element is positioned so as to be intermediate an air inlet and an air outlet and wherein a fan is driven by a motor so as to urge air inwardly through the inlet and discharge the air towards the outlet. The portable room air purifiers further include at least one scroll which is oriented so as to direct air from the fan generally tangently with respect to the axis of the fan through a scroll discharge opening. A deflector is mounted in spaced relationship with respect to the discharge opening and the deflector tapers inwardly relative to the scroll to thereby define an open passageway through which air is directed as it is exhausted through the air outlet.

In some embodiments, a single scroll of generally arcuate configuration may be utilize to discharge air towards a generally circular deflector which extends in surrounding relationship with respect to the scroll but which tapers inwardly towards the scroll away from the discharge opening formed by the scroll so that air being discharged is partially channelled about the unit as it is exhausted therefrom. In other embodiments, two or more scrolls may be utilized, each of which is generally arcuate. In this manner, at least two (2) exhaust openings are created by the scrolls with the exhaust openings being spaced from the deflector wall so as to form separate conveying passageways through which air is discharged from the filter unit.

In the preferred embodiment, the housing is generally cylindrical so that the passageways formed between the scrolls and the deflector wall are also generally arcuate thereby providing for discharge generally around the entire periphery of the unit.

The portable room air purifier also incorporates a HEPA filter element of cylindrical configuration which is mounted to a support seated on the scroll. A motor to drive a centrifugal fan is mounted centrally of the filter element so as to provide a compact configuration for the apparatus.

To insure that the unit may be safely operated in environments where children are present, the housing includes a cover which is interlocked to a base with a safety switch being mounted so as to terminate power to the motor in the event the cover is unlocked or loosened with respect to the base or otherwise compromised such as by an accidental fracturing of the cover.

It is the primary object of the present invention to provide a very compact portable room air purifier wherein the discharge of air is generally radially outwardly about the entire periphery of the unit so that a uniform distribution of filtered air is accomplished within an area in which the unit is operated.

It is another object of the present invention to provide a portable compact room air purifier which may be economically constructed so that it may be available to a greater portion of the consuming public and wherein the unit is designed to prevent operation of the motor and fan in the event any effort is made to access the interior of the unit by removing the cover or wherein the unit is automatically deactivated upon the destruction of the housing.

It is also an object of the present invention to provide a compact portable room air purifier which incorporates a cylindrical HEPA filter element which is effective to remove 99.97% of the particles of 0.3 micron or larger from the air in a room in which the unit is operated.

BRIEF DESCRIPTION OF THE DRAWINGS

FIG. 5 is a schematic partial cross sectional view of an alternative embodiment of the present invention.

FIGS. 6 is a partial assembly view of the room air purifier shown in FIG. 5.

FIG. 7 is a cross sectional view taken along lines 7—7 of FIG. 5.

DESCRIPTION OF THE PREFERRED EMBODIMENTS

Figure 1:
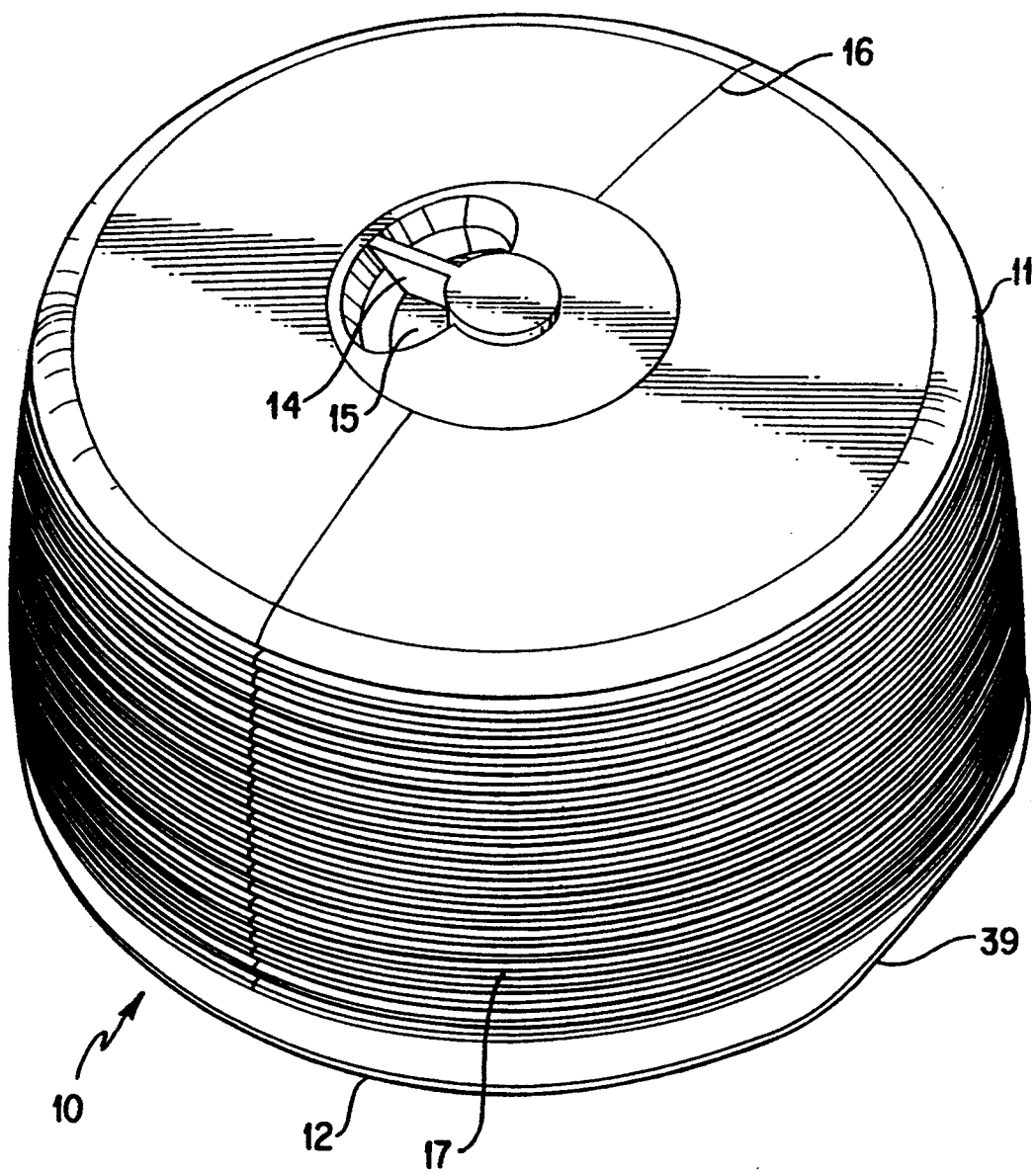
FIG. 1 is top perspective view of the preferred embodiment of the present invention.

With continued reference to the drawings, the compact portable room air purifier of the present invention 10 is shown as including a cover 11 which is selectively mounted to a base 12. An "ON-OFF" and speed control switch 13 extends through the top of the central portion of the cover and includes an operating handle 14 which is recessed within a recess 15 so as to be substantially flush with the contour of the upper surface. In the embodiment shown in FIGS. 1–4, the cover is molded of two (2) half sections which are assembled along a weld line 16. The cover includes a plurality of outwardly extending fins 17 which define a plurality of air inlet openings 18 which are vertically and horizontally spaced about the upper portion of the cover and also define a plurality of air outlet openings 19 adjacent to and about the lower portion of the cover. As shown, the air inlet openings 18 and the outlet openings 19 are provided about the entire periphery of the cover. The horizontal fins 17 are reinforced at spaced intervals around the circumference of the cover by vertically extending ribs 20 which are integrally molded therewith.

Mounted within the cover is a bracket assembly 21 having an annular open base portion 22 and a plurality of vertically extending and spaced leg portions 23. The bracket assembly further includes an upper electrical housing 24 in which is mounted the "ON-OFF" and speed control switch 13. The switch 13 is electrically connected through electrical wires (not shown) to an electric motor 26. The motor is suspended by a plurality of pins 27 which extend through openings 28 in each of the legs 23 of the bracket assembly and are secured by conventional fastening elements or welded thereto. The motor is mounted generally centrally of the cover and includes a drive shaft 29 which extends downwardly towards the base 12 of the unit. A generally cylindrical HEPA filter element 30 is seated in surrounding relationship with respect to the motor and is engaged between the top of the cover and the annular base portion 22 of the bracket assembly. The HEPA filter element includes upper and lower annular seals 31 which are formed of a resilient or elastomeric material. The structure of the filters may vary, however, it is generally preferred that the filter elements include a plurality of vertically extending pleated portions of the type disclosed in U.S. Pat. No. 4,629,482, the subject matter of which is incorporated herein by reference.

Figure 2:
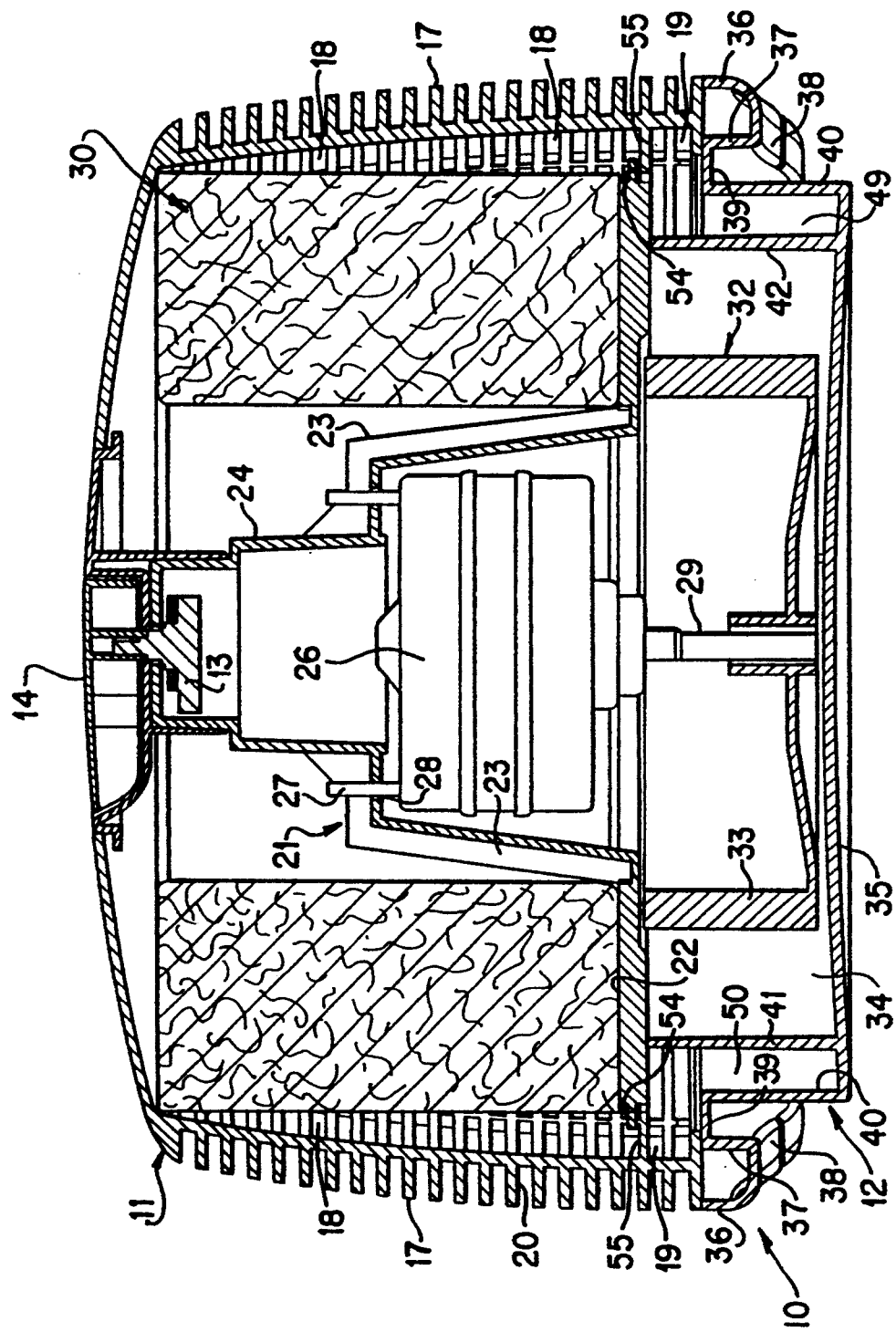
FIG. 2 is a cross sectional view taken through the filter unit shown in FIG. 1.

A centrifugal fan 32 is mounted to the drive shaft 29 of the motor 26. The centrifugal fan may include a plurality of radially spaced blades 33. It should be noted that the term "centrifugal fan" includes other types of fans known in the industry as forward curved, radial and backward inclined and that the fan structure may change without departing from the inventive characteristics of the present invention. As shown in FIG. 2, the centrifugal fan 32 is disposed within a cavity 34 defined by the base 12.

The base 12 includes a bottom wall 35 and a pair of annular side walls 36 and 37 which form a generally U-shaped trough which is molded at 38 so as to form contoured handles for lifting the air purifier. The base further includes an annular deflector wall 40 which extends upwardly from the bottom wall 35 but terminates in spaced relationship with respect to the annular base portion 22 of the bracket assembly 21. An annular seat 39 is formed between the deflector wall 40 and side wall 37. The deflector wall 40 extends along an imaginary circle having its axis located at the center point of the base 35. Extending upwardly from the base 35 interiorly of the deflector wall 40 are a pair of scrolls 41 and 42 each of which include first and second ends 43, 44, 45 and 46, respectively. The scrolls are spaced from another adjacent their ends so as to form exhaust openings 47 and 48 through which air is directed generally tangently with respect to the rotational axis of the centrifugal fan. Each of the scrolls 41 and 42 is generally arcuately configured although they need not be arc segments of a circle per se so that the ends 43 and 45 may flare outwardly from a true circle. With particular reference to FIG. 2 of the drawings, it should be noted that the scrolls 41 and 42 extend upwardly above the upper edge of the deflector wall 40, and in the embodiment shown, provide support for the annular base portion 22 of the bracket assembly 21.

Figure 4:
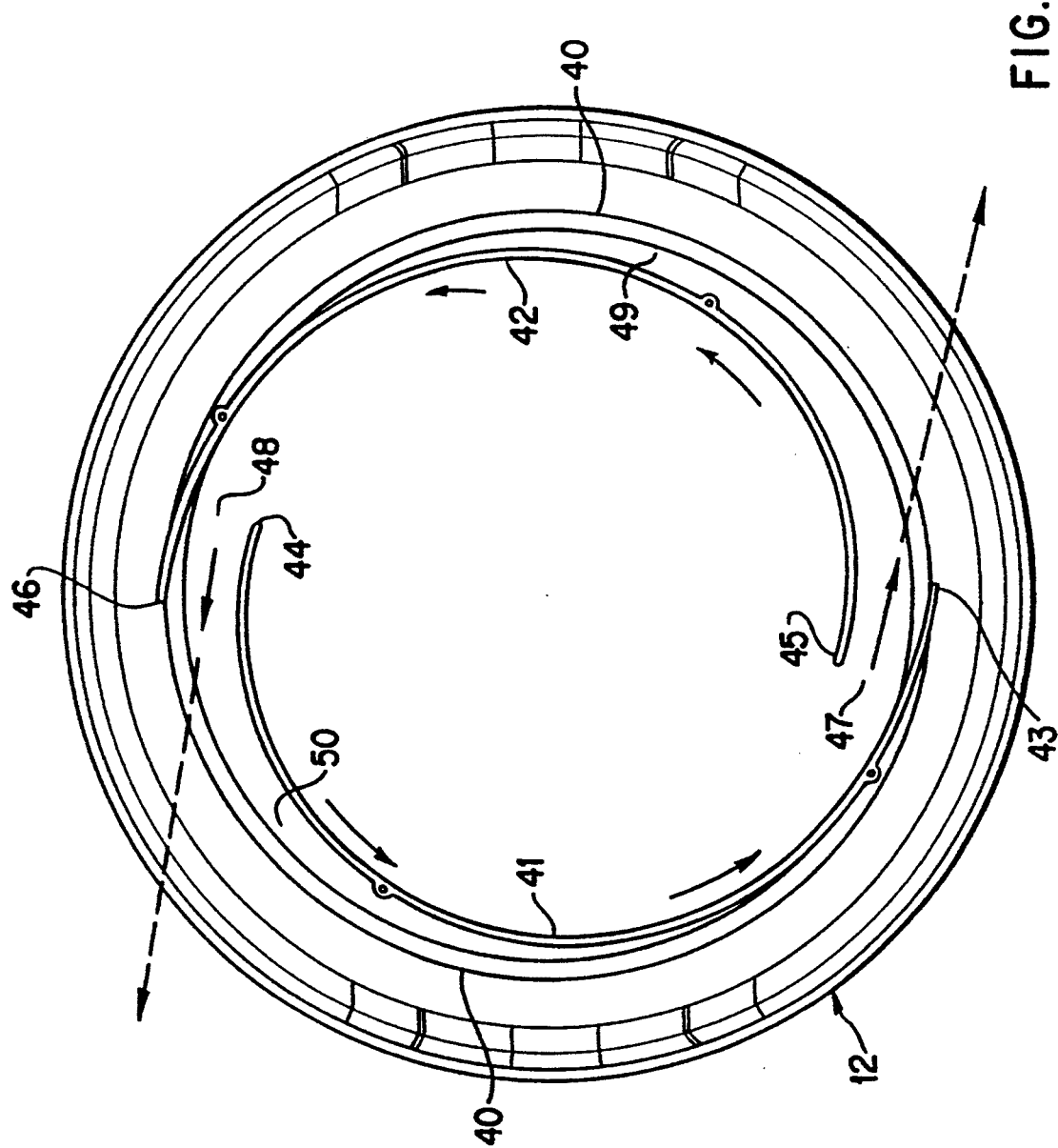
FIG. 4 is a top plan view of the base of the portable room air purifier of FIG. 1 showing a pair of scrolls associated with a common deflector.

With particular reference to FIG. 4, the relationship between the scrolls 41 and 42 and the deflector wall 40 is such as to define a pair of arcuate and inwardly tapering passageways 49 and 50, each of which is open along its entire length along the upper portion thereof so as to communicate with the air outlets 19 formed in the cover 11. In this manner, as air is discharged outwardly through the exhaust openings 47 and 48 as shown by the arrows in FIG. 4, a certain portion of the air will be vented immediately through the adjacent air outlets 19 however, a portion of the air will be channelled along the passageways 49 and 50 which converge relative to one another thereby forcing the air upwardly and outwardly through the downstream air outlets 19. In this manner, a generally uniformed outward distribution of radial flow of air is created from the openings 19. Without the relationship between the scrolls and the deflector, the air would be directed outwardly of the unit in two (2) directions as shown by the dotted lines extending from the outlet openings 47 and 48. Such flow would not create uniform air distribution within a room in which the unit is operating.

The structure of the embodiment disclosed in FIGS. 1–4 includes two scrolls with a single deflector to establish a uniform distribution of exhaust flow from the unit around the periphery thereof. It should be noted that in some instances, a single scroll and deflector arrangement may be utilized and in other instances 3, 4 or more scrolls may be utilized with one or more deflectors to accomplish the air distribution taught by the embodiment shown in FIGS. 1–4.

The cover 11 is locked in covering relationship with respect to the base 12 by being selectively engaged with the base portion 22 of the bracket assembly 21. The bracket assembly is connected to the base by screws (not shown) which extend through spaced openings 51 in the base portion thereof and into threaded open channels 52 molded at spaced locations along the outer walls of each of the scrolls 41 and 42. A plurality of notches 53 are formed in the periphery of the base portion 22 of the bracket assembly which thereby divide the periphery into spaced arcuate locking flanges 54. The cover 11 includes a plurality of internally extending locking elements 55 of a length to be receivable through the notches 53 as the cover is seated so that the lowermost fin 17 is seated on base side wall 36 and seat 39. Thereafter, by rotating the cover relative to the base, the locking element 55 will move out of alignment with the notches and will engage the lower surface of the locking flanges 54, as shown in FIG. 2. In this position, the cover cannot be directly removed from the base without rotating the cover to realign the locking elements 55 with the notches 53.

Figure 3:
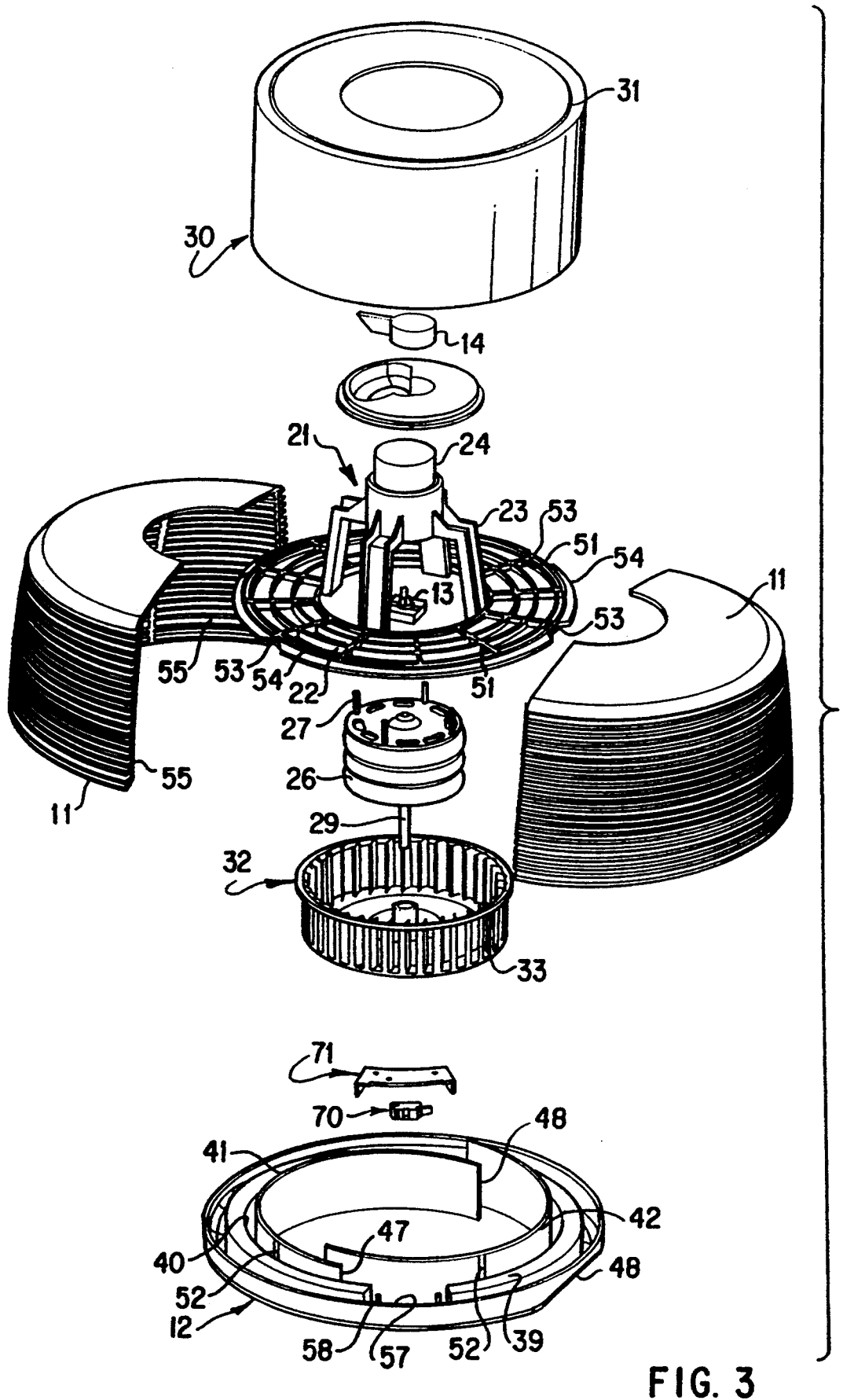
FIG. 3 is an assembly view of the portable air room purifier shown in FIG. 1.
Figure 3A:
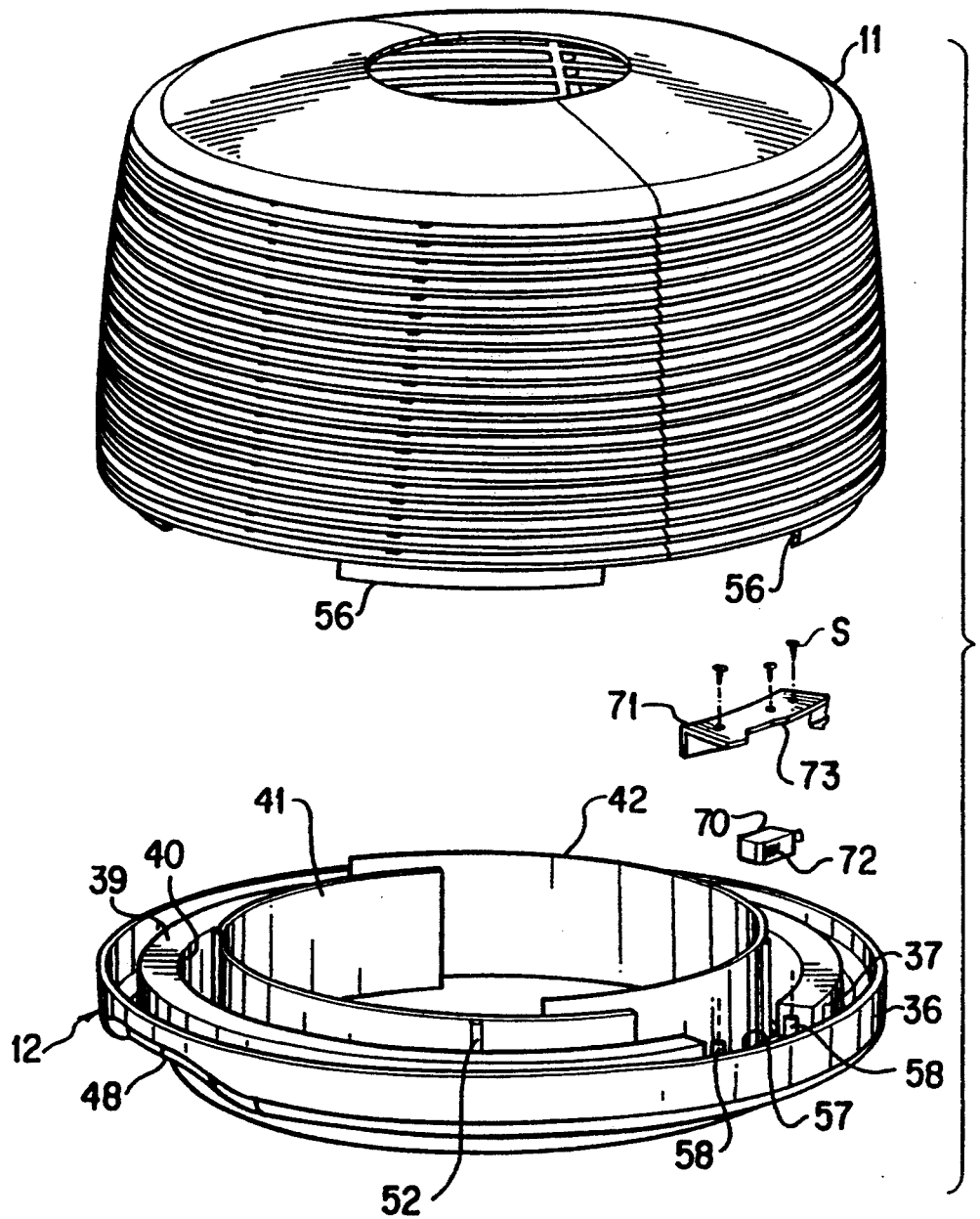
FIG. 3A is a partially assembly view showing the safety switch, cover and base of the room air purifier shown in FIG. 1.

The locking relationship between the cover 11 and base 12 also includes a safety interlock for preventing the operation of the motor and fan in the event the cover is not fully locked in seated relationship to the base. To accomplish this, the cover includes at least one, and preferably two or more, depending arcuate flanges 56 which extend downwardly from the lowermost portion of the base, as shown in FIG. 3A. The flanges 56 are designed to depend adjacent base side wall 37 and within the U-shaped trough formed between the wall 37 and side wall 36. A power control safety switch 70 is mounted within a molded recess 57 formed along a portion of the base seat 39 and is retained therein by a cover 71 which is threadingly locked to the base by screws "S" which extend into threaded mounts 58 which are molded integrally into the base.

The switch 70 is selectively connected by a conventional power cord (not shown) to a source of electrical supply and is connected by electrical wires (not shown) to the "ON-OFF" switch 13.

The switch includes an internal "MAKE-BREAK" contact which is automatically returned to a "BREAK" or open condition whereby no power is conveyed to the "ON-OFF" switch 13. The internal "MAKE-BREAK" contact includes an external spring loaded roller actuator 72. When the roller actuator is pushed inwardly toward the switch housing, the "MAKE-BREAK" contact is urged into a "MAKE" condition thereby supplying power to the "ON-OFF" switch 13.

When the cover 11 is seated on the base and rotated into locked relationship therewith, a depending flange 56 will be guided into a slot defined between the side wall 73 of the cover 71 and the outer side wall 36 of the base wherein the roller actuator 72 is situated. The flange 56 will engage the roller actuator and retain it against the switch housing thereby making the "MAKE-BREAK" contact and supplying power to the "ON-OFF" switch 13. When the cover 11 is rotated from a locked relationship from the base, the flange 56 will be disengaged from the roller actuator thereby breaking the "MAKE-BREAK" contact and automatically terminating power to the "ON-OFF" switch 13 so that the motor and fan are instantly deactivated. With specific reference to FIG. 5, a schematic of a modified portable air purification unit 59 is disclosed wherein the deflector is formed of a pair of annular walls 60 and 61 which are vertically spaced from one another so as to define an annular air outlet opening 62. In this embodiment, the cover 11 does not extend to the air outlet openings as with the previous embodiment and the cover merely surrounds the HEPA filter element 30 in a manner similar to that disclosed in the aforementioned U.S. Pat. No. 4,629,482. FIG. 5 shows the relationship of components wherein a centrifugal fan operating within a base 12' would be mounted centrally of a single scroll 64 with the scroll having a discharge opening 65 through which filtered air is discharged towards the annular outlet opening 62. A secondary plate 66 which includes the annular wall 62 is mounted in overlying relationship with respect to the scroll 64 as shown by the assembly view of FIG. 6. As with the previous embodiment, the air that is being discharged through the opening 65 is directed into an open tapering passageway 67 which is formed between the spaced side walls 61 and 62 of the base and the outer surface of the scroll 64. In this manner, some of the air being discharged from the opening 65 exits the annular exhaust outlet adjacent thereto while other air is conveyed by the inner surfaces of the side walls 61 and 62 and is compressed outwardly by the converging outer wall of the scroll, as is shown by the arrows in FIG. 7. Therefore, in this embodiment, a single scroll is utilized with a pair of spaced deflectors in order to distribute the exhaust air from the centrifugal fan generally uniformly radially outwardly with respect to the unit.

The concept of utilizing spaced deflector walls with an annular outlet opening defined therebetween could be incorporated within the teachings of the invention which utilize two or more scrolls to direct the discharge of air from the air purifier.

We claim:

1. A portable air purifier comprising a housing having an air inlet and an air outlet, a filter means disposed within said housing and between said air inlet and outlet, a fan means disposed within said housing, a motor means for driving said fan means to draw air in through said air inlet and through said filter means and out through said air outlet, at least one generally arcuate scroll mounted within said housing between said fan means and said air outlet, said scroll having inner and outer surfaces and defining an exhaust opening through which air is exhausted toward said air outlet, a deflector means adjacent said air outlet extending from said scroll exhaust opening and progressively closer to said outer surface of said scroll to thereby define an opening tapering passageway between said scroll and said deflector means through which air is radially directed at least outwardly of said air outlet of said housing.

2. The portable air purifier of claim 1 in which said deflector means is generally arcuate, and said tapering passageway extends substantially around said housing.

3. The portable air purifier of claim 2 in which said scroll has a first height dimension and said deflector means has a second height dimension which is less than said first height dimension.

4. The portable air purifier of claim 3 in which said air outlet extends substantially around the periphery of said housing.

5. The portable air purifier of claim 1 including plural scrolls each having first and second ends, said first end of each scroll and said second end of an adjacent scroll defining plural exhaust openings, and said deflector means and said plural scrolls defining plural tapering passageways for discharging air radially outwardly from the periphery of said housing.

6. The portable air purifier of claim 5 in which said deflector means is generally circular.

7. The portable air purifier of claim 5 in which said scrolls are spaced radially outwardly with respect to said fan means.

8. The portable air purifier of claim 7 in which each of said scrolls has a first height dimension and said deflector means has a second height dimension which is less than said first height dimension.

9. The portable air purifier of claim 7 in which said means is a centrifugal fan means and said filter means is a tubular HEPA filter.

10. The portable air purifier of claim 9 in which said air inlet extends around said filter means.

11. The portable air purifier of claim 5 in which said means is a centrifugal fan means and said filter means is a HEPA filter.

12. The portable air purifier of claim 1 in which said means is a centrifugal fan means and said filter means is a HEPA filter.

13. The portable air purifier of claim 5 in which said housing includes a base and a cover, each of said base and cover including interlocking components for securing said cover to said base, and safety switch means electrically connected to deactivate said motor when said base and said cover are not secured to one another.

14. The portable air purifier of claim 13 in which said cover includes at least one depending flange, said safety switch means being electrically non-conducting when said cover is not secured to said base and including a housing and a movable actuator, said actuator being selectively engageable by said depending flange to thereby permit electrical power to pass through said safety switch means to said motor means when said cover is secured to said base.

15. The portable air purifier of claim 14 including an "ON-OFF" switch means electrically connected between said safety switch means and said motor means.

16. The portable air purifier of claim 1 in which said housing includes a base and a cover, each of said base and cover including interlocking components for securing said cover to said base, and safety switch means electrically connected to deactivate said motor when said base and said cover are not secured to one another.

17. The portable air purifier of claim 16 in which said cover includes at least one depending flange, said safety switch means being electrically non-conducting when said cover is not secured to said base and including a housing and a movable actuator, said actuator being selectively engageable by said depending flange to thereby permit electrical power to pass through said safety switch means to said motor means when said cover is secured to said base.

18. The portable air purifier of claim 17 including an "ON-OFF" switch means electrically connected between said safety switch means and said motor means.

19. The portable air purifier of claim 1 in which said deflector means includes a pair of vertical opposing wall portions having a generally continuous opening therebetween defining said air outlet.

20. The portable air purifier of claim 19 in which said deflector means is generally circular.

21. The portable air purifier of claim 20 in which said scrolls are spaced radially outwardly with respect to said fan means.

22. The portable air purifier of claim 21 in which said means is a centrifugal fan means and said filter means is a HEPA filter.

23. A portable air purifier comprising:
a housing having an air inlet and a base having an air outlet;
a filter means disposed within said housing and between said air inlet and said base;
a fan means disposed within said housing;
a motor means for driving said fan means to draw air through said air inlet into said filter and out through said air outlet;
at least one generally arcuate scroll mounted within said base between said fan means and said air outlet, said scroll having inner and outer surfaces and defining an exhaust opening through which air is exhausted toward said air outlet.

24. The portable air purifier of claim 23 including plural scrolls, each having first and second ends, said first end of each scroll and said second end of an adjacent scroll defining plural exhaust openings.

25. The portable air purifier of claim 23 in which said fan means is a centrifugal fan means and said filter means is a tubular HEPA filter.

26. The portable air purifier of claim 24 in which said fan means is a centrifugal fan means and said filter means is a tubular HEPA filter.

27. The portable air purifier of claim 23 in which said air inlet extends around said filter means.

28. The portable air purifier of claim 25 in which said air inlet extends around said filter means.

29. The portable air purifier of claim 26 in which said air inlet extends around said filter means.

30. The portable air purifier of claim 23 in which said housing includes a base and a cover, each of said base and cover including interlocking components for securing said cover to said base, and safety switch means electrically connected to deactivate said motor when said base and said cover are not secured to one another.

31. The portable air purifier of claim 23 in which said scroll is spaced radially outwardly with respect to said fan means.

32. The portable air purifier of claim 31 wherein said scroll and said base define said exhaust opening.

* * * * *